(12) United States Patent
Lin et al.

(10) Patent No.: US 10,769,314 B2
(45) Date of Patent: Sep. 8, 2020

(54) FINGERPRINT SENSING INTEGRATED CIRCUIT DEVICE

(71) Applicant: ELAN MICROELECTRONICS CORPORATION, HsinChu (TW)

(72) Inventors: Chia-Hsing Lin, Hsinchu (TW); Yi-Hsin Tao, Hsinchu (TW); I-Hau Yeh, Taipei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 200 days.

(21) Appl. No.: 15/891,341

(22) Filed: Feb. 7, 2018

(65) Prior Publication Data

US 2019/0026534 A1 Jan. 24, 2019

(30) Foreign Application Priority Data

Jul. 18, 2017 (TW) .............................. 106123898 A

(51) Int. Cl.
| | |
|---|---|
| *G06F 21/85* | (2013.01) |
| *G06K 9/00* | (2006.01) |
| *G06F 21/32* | (2013.01) |
| *H04L 9/32* | (2006.01) |
| *G06F 21/62* | (2013.01) |

(52) U.S. Cl.
CPC .............. *G06F 21/85* (2013.01); *G06F 21/32* (2013.01); *G06F 21/6209* (2013.01); *G06K 9/00013* (2013.01); *G06K 9/00087* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 2007/0239990 A1 † | 10/2007 | Fruhauf | |
| 2009/0070592 A1 † | 3/2009 | Boshra | |
| 2009/0327743 A1 * | 12/2009 | Finlayson | ............... G06F 21/32 713/186 |
| 2010/0180136 A1 † | 7/2010 | Thompson | |
| 2013/0332353 A1 * | 12/2013 | Aidasani | ............. G06K 19/0718 705/41 |
| 2014/0267659 A1 * | 9/2014 | Lyon | .................... G06K 9/0002 348/77 |

(Continued)

FOREIGN PATENT DOCUMENTS

| | | | |
|---|---|---|---|
| JP | H1119069 | † | 2/1997 |
| KR | 20150065167 | † | 12/2015 |
| TW | 201712598 A | | 4/2017 |

*Primary Examiner* — Henry Tsang
(74) *Attorney, Agent, or Firm* — Muncy, Geissler, Olds & Lowe, P.C.

(57) ABSTRACT

A fingerprint sensing integrated circuit device includes a fingerprint sensing device, an encryption unit, a multiplexer and a transmission interface. The encryption unit is connected to the fingerprint sensing device. The multiplexer has an output end, a first input end and a second input end. The first input end of the multiplexer is connected to the fingerprint sensing device. The second input end of the multiplexer is connected to the encryption unit. The multiplexer connects the output end to the second end according to a selection signal. The transmission interface is connected to the output end of the multiplexer.

8 Claims, 3 Drawing Sheets

(56) References Cited

U.S. PATENT DOCUMENTS

| | | | |
|---|---|---|---|
| 2014/0282935 A1* | 9/2014 | Lal | G06F 21/72 |
| | | | 726/6 |
| 2017/0213097 A1* | 7/2017 | Vogel | G06K 9/209 |
| 2018/0164943 A1* | 6/2018 | Hung | G06F 3/0416 |
| 2018/0270205 A1* | 9/2018 | Jiang | H04L 63/0428 |
| 2018/0270295 A1† | 9/2018 | Jiang | |

\* cited by examiner
† cited by third party

FINGERPRINT SENSING INTEGRATED CIRCUIT DEVICE

BACKGROUND OF THE INVENTION

1. Field of the Invention

The present invention relates to an integrated circuit device, and more particularly, to a fingerprint sensing integrated circuit device.

2. Description of the Prior Art

Fingerprint identification technology is widely used for personal identity verification and has been gradually applied in various electronic devices (e.g., notebooks, mobile phones).

In order to prevent fingerprint data from being stolen, the fingerprint data may be encrypted. Please refer to FIG. 1. FIG. 1 is a schematic diagram illustrating a conventional electronic system 1 having fingerprint sensing function and encryption function. The electronic system 1 includes a fingerprint sensing device 12 and a microcontroller 14. The microcontroller 14 has an encryption unit 16. The encryption unit 16 encrypts data transmitted from the fingerprint sensing device 12. The fingerprint sensing device 12 and the microcontroller 14 are produced with different semiconductor manufacturing process and are disposed in different package, respectively. The fingerprint sensing device 12 senses the user's fingerprints and transmits the sensed fingerprint data to the microcontroller 14. The encryption unit 16 of the microcontroller 14 encrypts the fingerprint data. However, since the fingerprint sensing device 12 and the microcontroller 14 are disposed on different integrated circuits, external hackers may steal the fingerprint data sensed from the signal transmission path (or connection channel) between the fingerprint sensing device 12 and the microcontroller 14. Thus, the prior art needs to be improved.

SUMMARY OF THE INVENTION

It is therefore an objective of the present invention to provide a fingerprint sensing integrated circuit device capable of preventing data theft, to solve the problems in the prior art.

The present invention discloses a fingerprint sensing integrated circuit device, comprising: a fingerprint sensing device; an encryption unit, connected to the fingerprint sensing device; a multiplexer comprising an output end, a first input end and a second input end, the first input end connected to the fingerprint sensing device, the second input end connected to the encryption unit, wherein the multiplexer connects the output end to the second input end according to a selection signal; and a transmission interface, connected to the output end of the multiplexer.

The present invention further discloses a fingerprint sensing integrated circuit device, comprising: a fingerprint sensing device; an encryption unit, connected to the fingerprint sensing device; a multiplexer comprising an output end, a first input end and a second input end, the first input end connected to the fingerprint sensing device, the second input end receiving first data, wherein the multiplexer connects the output end to the second input end according to a selection signal; a first transmission interface, connected to the encryption unit; and a second transmission interface, connected to the multiplexer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
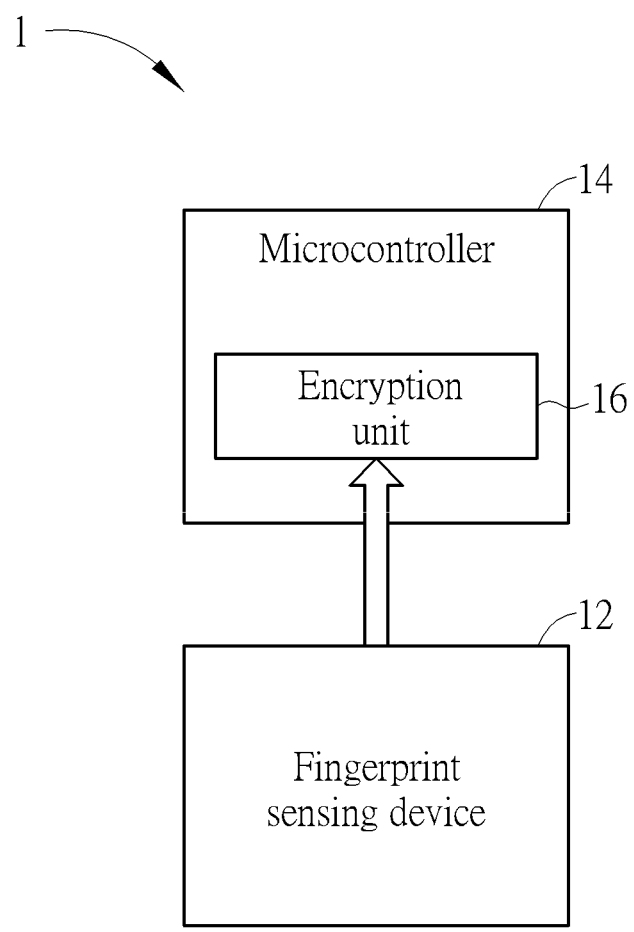
FIG. 1 is a schematic diagram illustrating a conventional electronic system having fingerprint sensing function and encryption function.
Figure 2:
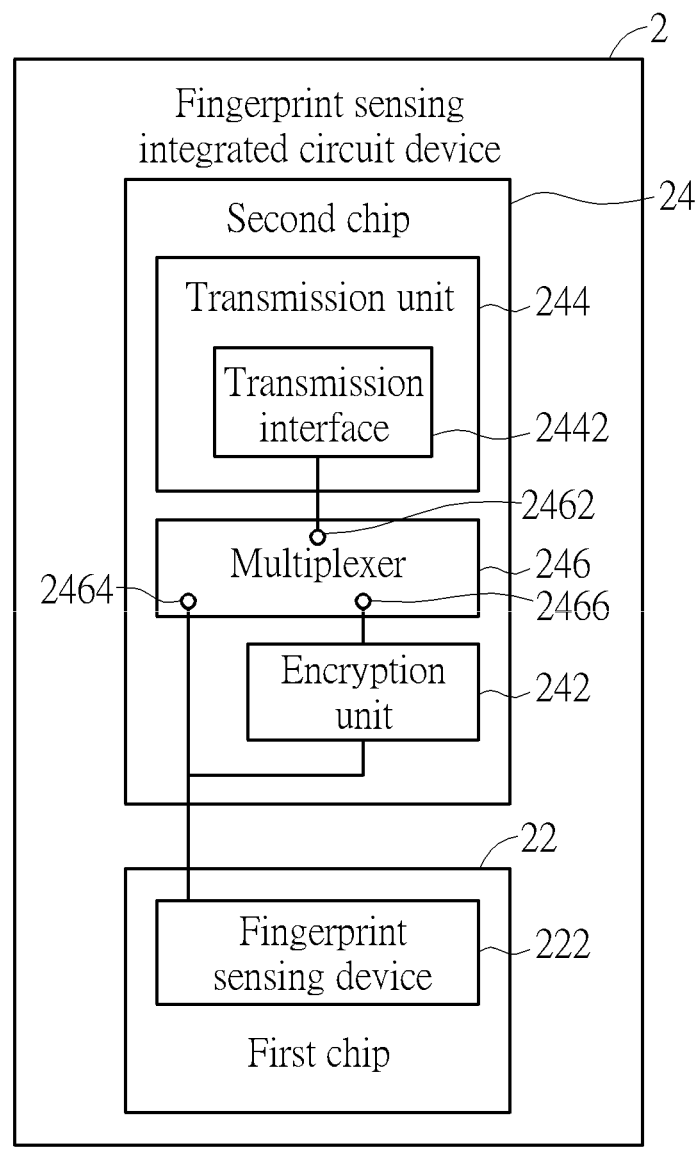
FIG. 2 is a schematic diagram illustrating a fingerprint sensing integrated circuit device according to an embodiment of the present invention.

Please refer to FIG. 2, which is a schematic diagram illustrating a fingerprint sensing integrated circuit device 2 according to an embodiment of the present invention. The fingerprint sensing integrated circuit device 2 includes a first chip 22 and a second chip 24. The first chip 22 and the second chip 24 are disposed in a single integrated circuit device (i.e., fingerprint sensing integrated circuit device 2). That is, the first chip 22 and the second chip 24 are in the same package structure. In an embodiment, the first chip 22 and the second chip 24 are produced with different semiconductor manufacturing process. The first chip 22 includes a fingerprint sensing device 222. The fingerprint sensing device 222 is utilized for detecting fingerprints and generating fingerprint data. The fingerprint sensing device 222 may be a capacitive fingerprint sensing device or an optical fingerprint sensing device. The fingerprint sensing device 222 includes a sensor for sensing fingerprint and circuits for processing signals sensed by the sensor. The second chip 24 is connected to the first chip 22 for receiving fingerprint data detected by the fingerprint sensing device 222. The second chip 24 includes an encryption unit 242, a transmission unit 244 and a multiplexer 246. The multiplexer 246 includes an output end 2462, a first input end 2464 and a second input end 2466. As shown in FIG. 2, the output end 2462 of the multiplexer 246 is connected to the transmission unit 244. The first input end 2464 of the multiplexer 246 is connected to the fingerprint sensing device 222. The second input end 2466 of the multiplexer 246 is connected to the encryption unit 242. An input end of the encryption unit 242 is connected to the fingerprint sensing device 222. The fingerprint data detected by the fingerprint sensing device 222 is transmitted to the encryption unit 242 and the multiplexer 246 respectively. The encryption unit 242 is utilized for encrypting the fingerprint data detected by the fingerprint sensing device 222 to generate encrypted data and transmitting the encrypted data to the multiplexer 246. The multiplexer 246 can receive the fingerprint data outputted by the fingerprint sensing device 222 via the first input end 2464, receive the encrypted data outputted by the encryption unit 242 via the second input end 2466, and output the fingerprint data or the encrypted data according to a selection signal. The transmission unit 244 includes a transmission interface 2442. The encrypted data outputted by the encryption unit 242 or the fingerprint data outputted by the fingerprint sensing device 222 can be transmitted to external devices via the transmission interface 2442. The transmission interface 2442 may be a serial peripheral interface (SPI), an inter-integrated circuit ($I^2C$) interface, a RS-232 interface, a universal asynchronous receiver/transmitter (UART) interface, a universal serial bus (USB) interface, or any other type of transmission interface.

The second chip 24 is a controller, which includes a processor (not shown in figures). In an embodiment, the processor is connected to the encryption unit 242, the multiplexer 246 and the transmission unit 244. When testing the fingerprint sensing integrated circuit device 2 (i.e., performing a testing process for the fingerprint sensing integrated circuit device 2 after packaging process, the processor executes a test program to provide different selection signals for the multiplexer 246. The output of the multiplexer 246 is determined by the different selection signals. For example, when the selection signal is a digital signal "0", the multiplexer 246 connects the output end 2462 to the first input end 2464, so that the multiplexer 246 outputs the fingerprint data via the output end 2462. The outputted fingerprint data is transmitted to the external device via the transmission interface 2442 for testing whether the fingerprint sensing device 222 is operating normally. When the selection signal is a digital signal "1", the multiplexer 246 connects the output end 2462 to the second input end 2466, so that the multiplexer 246 outputs the encrypted data via the via the output end 2462. The outputted encrypted data is transmitted to the external device via the transmission interface 2442 for testing whether the encryption unit 242 is operating normally. In an embodiment, during the testing process of the fingerprint sensing integrated circuit device 2, the fingerprint data outputted by the fingerprint sensing device 222 is predetermined fingerprint data.

After the testing process has been completed, an operating program code is programmed into the fingerprint sensing integrated circuit device 2. The processor of the second chip 24 executes the operating program code so as to provide a selection signal (e.g., a digital signal "1") to the multiplexer 246. According to the selection signal, the multiplexer 246 only connects the output end 2462 to the second input end 2466, so that the multiplexer 246 only outputs the encrypted data of the encryption unit 242, rather than outputs the fingerprint data detected by the fingerprint sensing device 222. The encrypted data is transmitted to the external device via the transmission interface 2442 for the following fingerprint recognition process.

In an embodiment, the fingerprint sensing integrated circuit device 2 includes a plurality of contacts (not shown in figures) for communicating with external devices. A contact P (not shown in figures) is connected to the transmission interface 2442 for transmitting the encrypted data or the fingerprint data. When testing the fingerprint sensing integrated circuit device 2, the fingerprint data can be obtained through the contact P, and the fingerprint data can be used for testing whether the fingerprint sensing device 222 is operating normally. When the fingerprint sensing integrated circuit device 2 is applied in an electronic device (e.g., a mobile phone) for sensing user's fingerprints, the contact P only outputs the encrypted data, and no contact is available for obtaining the unencrypted fingerprint data. Further, since the first chip 22 and the second chip 24 are disposed in a package, the external hackers cannot intrude into the signal transmission path (or connection channel) between the first chip 22 and the second chip 24 to steal the fingerprint data. Therefore, the fingerprint sensing integrated circuit device 2 of the invention can effectively prevent unwanted access to the fingerprint data, thus enhancing the data security.

In an alternative embodiment, the fingerprint sensing device 222, the encryption unit 242, the transmission interface 2442 and the multiplexer 246 are disposed on a single chip. The interconnections and operations of the units can be referred from above and further description thereof is omitted for brevity.

Figure 3:
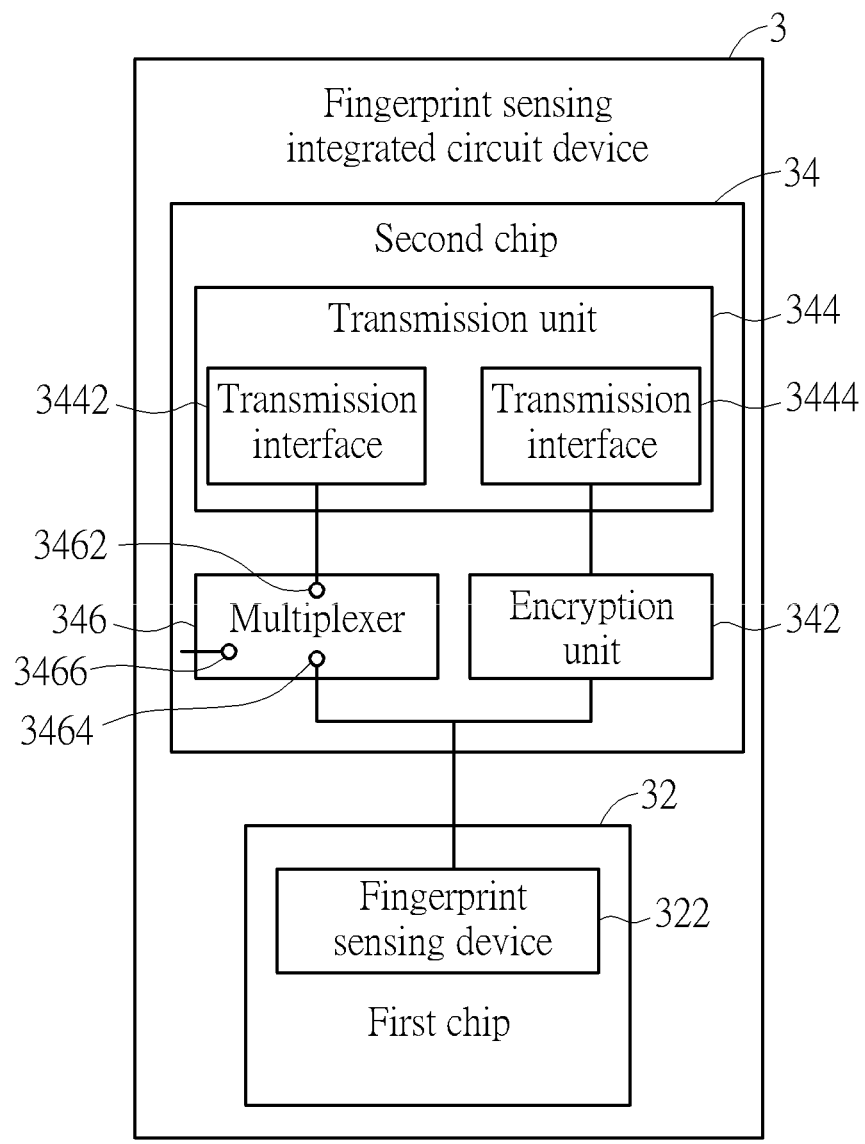
FIG. 3 is a schematic diagram illustrating a fingerprint sensing integrated circuit device according to an alternative embodiment of the present invention

Please refer to FIG. 3, which is a schematic diagram of a fingerprint sensing integrated circuit device 3 according to an alternative embodiment of the present invention. Please note that the units in the fingerprint sensing integrated circuit device 3 shown in FIG. 3 with the same designations as those in the fingerprint sensing integrated circuit device 2 shown in FIG. 2 have similar operations and functions. The fingerprint sensing integrated circuit device 3 includes a first chip 32 and a second chip 34. The first chip 32 and the second chip 34 are disposed in a single integrated circuit device (i.e., fingerprint sensing integrated circuit device 3). The first chip 32 and the second chip 34 are in the same package structure. The first chip 32 includes a fingerprint sensing device 322. The second chip 34 is a controller. The second chip 34 includes an encryption unit 342, a transmission unit 344 and a multiplexer 346. The transmission unit 344 includes a transmission interface 3442 and a transmission interface 3444. The fingerprint sensing device 322 is connected to the encryption unit 342 and the multiplexer 346. The fingerprint data detected by the fingerprint sensing device 322 can be transmitted to the encryption unit 342 and the multiplexer 346 respectively. The encryption unit 342 is connected to the fingerprint sensing device 322 and the transmission interface 3444 of the transmission unit 344. The encryption unit 342 is utilized for encrypting the fingerprint data detected by the fingerprint sensing device 322 to generate encrypted data. The encryption unit 342 transmits the encrypted data to the multiplexer 346. The encrypted data outputted by the encryption unit 342 is transmitted to the external device via the transmission interface 3444.

As shown in FIG. 3, the multiplexer 346 includes an output end 3462, a first input end 3464 and a second input end 3466. The output end 3462 of the multiplexer 346 is connected to the transmission unit 3442. The first input end 3464 of the multiplexer 346 is connected to the fingerprint sensing device 322. The second input end 3466 of the multiplexer 346 is utilized for receiving first data. In an embodiment, the first data is predetermined data (e.g., a digital signal "0" or a digital signal "1"). The first data may be provided by a memory. In an alternative embodiment, the first data is output data of a function circuit. The first input end 3464 of the multiplexer 346 is connected to the fingerprint sensing device 322 and the second input end 3466 of the multiplexer 346 is connected to a function circuit. As such, the multiplexer 346 transmits the fingerprint data or the first data to the transmission interface 3442 of the transmission unit 344 according to a selection signal. The transmission interface 3442 of the transmission unit 344 receives the fingerprint data or the first data outputted by the multiplexer 346. The transmission interface 3442 and the transmission interface 3444 can be utilized for communicating with external devices. Each of the transmission interface 3442 and the transmission interface 3444 may be an SPI interface, an I²C interface, a RS-232 interface, a UART interface, a USB interface, or any other type transmission interface.

The second chip 34 is a controller, which includes a processor (not shown in figures). In an embodiment, the processor is connected to the encryption unit 342, the multiplexer 346 and the transmission unit 344. When testing the fingerprint sensing integrated circuit device 3 (i.e., performing a testing process for the fingerprint sensing integrated circuit device 3 after packaging process), the processor executes a test program to provide different selection signals for the multiplexer 346. The output of the multiplexer 346 is determined by the different selection signals. For example, when the selection signal is a digital signal "0", the multiplexer 346 connects the output end 3462 to the first input end 3464, so that the multiplexer 346 outputs the fingerprint data via the output end 3462. The outputted fingerprint data is transmitted to the external device via the transmission interface 3442 for testing whether the fingerprint sensing device 322 is operating normally. When the selection signal is a digital signal "1", the multiplexer 346 connects the output end 3462 to the second input end 3466, so that the multiplexer 346 outputs the first data via the output end 3462. In an embodiment, when testing the fingerprint sensing integrated circuit device 3, the fingerprint data outputted by the fingerprint sensing device 322 is predetermined fingerprint data.

After the testing process has been completed, an operating program code is programmed into the fingerprint sensing integrated circuit device 3. The processor of the second chip 34 executes the operating program code so as to provide a selection signal (e.g., a digital signal "1") to the multiplexer 346. According to the selection signal, the multiplexer 346 connects the output end 3462 to the second input end 3466, so that the multiplexer 346 only outputs the first data, rather than outputs the fingerprint data detected by the fingerprint sensing device 322. The encrypted data generated by the encryption unit 342 is transmitted to the external device via the transmission interface 3444 for the following fingerprint recognition process.

In an embodiment, the fingerprint sensing integrated circuit device 3 includes a plurality of contacts (not shown in figures) for communicating with external devices. A contact P1 (not shown in figures) is connected to the transmission interface 3442 for transmitting the fingerprint data or the first data. A contact P2 (not shown in figures) is connected to the transmission interface 3444 for transmitting the encrypted data. When testing the fingerprint sensing integrated circuit device 3, the fingerprint data can be obtained through the contact P1, and the fingerprint data is applied for testing whether the fingerprint sensing device 322 is operating normally. When the fingerprint sensing integrated circuit device 3 is applied in an electronic device (e.g., a mobile phone) for sensing user's fingerprints, the contact P1 only outputs the first data, and no contact is available for obtaining the unencrypted fingerprint data. Further, since the first chip 32 and the second chip 34 are disposed in a package, the external hackers cannot intrude into the signal transmission path (or connection channel) between the first chip 32 and the second chip 34 to steal the fingerprint data. Therefore, the fingerprint sensing integrated circuit device 3 of the invention can effectively prevent unwanted access to the fingerprint data, thus enhancing the data security.

In an alternative embodiment, the fingerprint sensing device 322, the encryption unit 342, the transmission interface 3442 and the multiplexer 346 are disposed on a single chip. The interconnections and operations of the units can be referred from above and further description thereof is omitted for brevity.

Note that, the abovementioned embodiments are merely for illustrative purposes and those skilled in the art can make alternations and modifications accordingly. For example, the multiplexer can communicate with the fingerprint sensing device via an SPI interface or any other type of transmission interface according to an embodiment of the present invention. The encryption unit can communicate with the fingerprint sensing device via an SPI interface or any other type of transmission interface according to an embodiment of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint sensing integrated circuit device, comprising:
   a fingerprint sensing device configured to detect a fingerprint and generate fingerprint data;
   an encryption unit, connected to the fingerprint sensing device and configured to encrypt the fingerprint data and output encrypted fingerprint data;
   a multiplexer comprising an output end, a first input end and a second input end, the first input end connected to the fingerprint sensing device, the second input end connected to the encryption unit, wherein the multiplexer selectively outputs one of the fingerprint data and the encrypted fingerprint data, wherein the multiplexer connects the output end to the second input end according to a first selection signal in a normal operation mode, and wherein the multiplexer connects the output end to the first input end according to a second selection signal in a test operation mode; and
   a transmission interface, connected to the output end of the multiplexer.

2. The fingerprint sensing integrated circuit device of claim 1, wherein the fingerprint sensing integrated circuit device comprises a first chip and a second chip, the first chip comprises the fingerprint sensing device, and the second chip comprises the encryption unit, the multiplexer and the transmission interface.

3. The fingerprint sensing integrated circuit device of claim 1, wherein the transmission interface is one of a serial peripheral interface (SPI), an inter-integrated circuit (I²C) interface, a RS-232 interface, a universal asynchronous receiver/transmitter (UART) interface and a universal serial bus (USB) interface.

4. A fingerprint sensing integrated circuit device, comprising:
   a fingerprint sensing device configured to detect a fingerprint and generate fingerprint data;
   an encryption unit, connected to the fingerprint sensing device and configured to encrypt the fingerprint data and output encrypted fingerprint data;

a multiplexer comprising an output end, a first input end and a second input end, the first input end connected to the fingerprint sensing device, the second input end receiving first data, wherein the multiplexer selectively outputs one of the fingerprint data and the first data, wherein the multiplexer connects the output end to the second input end according to a first selection signal in a normal operation mode, and wherein the multiplexer connects the output end to the first input end according to a second selection signal in a test operation mode;

a first transmission interface, connected to the encryption unit; and a second transmission interface, connected to the multiplexer.

5. The fingerprint sensing integrated circuit device of claim 4, wherein the first data is predetermined data.

6. The fingerprint sensing integrated circuit device of claim 4, wherein the first data is provided by a function circuit.

7. The fingerprint sensing integrated circuit device of claim 4, wherein the fingerprint sensing integrated circuit device comprises a first chip and a second chip, the first chip comprises the fingerprint sensing device, and the second chip comprises the encryption unit, the multiplexer, the first transmission interface and the second transmission interface.

8. The fingerprint sensing integrated circuit device of claim 4, wherein the first transmission interface is one of a serial peripheral interface (SPI), an inter-integrated circuit ($I^2C$) interface, a RS-232 interface, a universal asynchronous receiver/transmitter (UART) interface and a universal serial bus (USB) interface, and the second transmission interface is one of an SPI interface, an PC interface, a RS-232 interface, a UART interface and a USB interface.

* * * * *